March 31, 1925. 1,531,963
H. C. McCLEARY
SPRING SUSPENSION FOR MOTOR VEHICLES
Filed Aug. 7, 1923 4 Sheets-Sheet 1
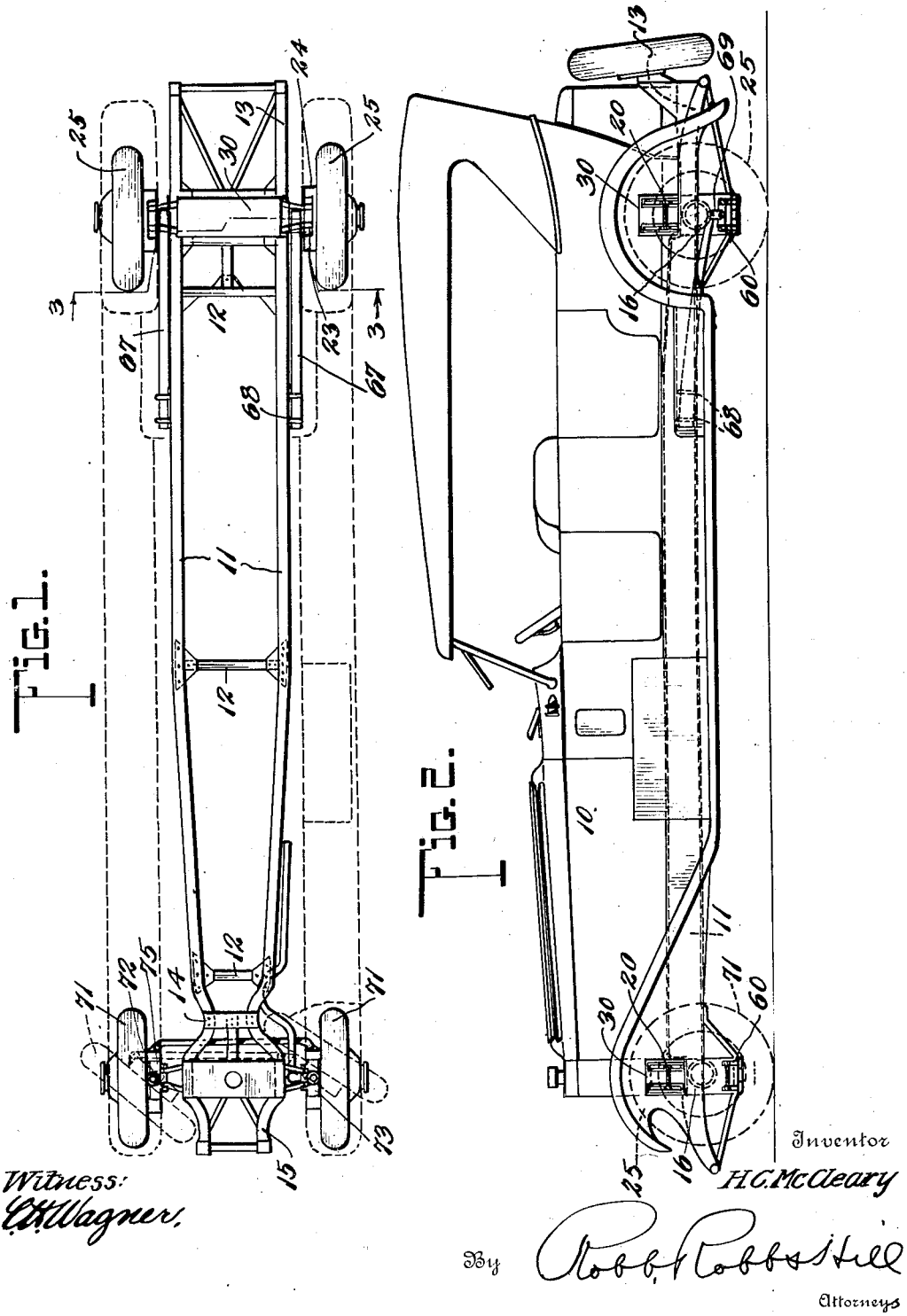
Inventor
H.C. McCleary

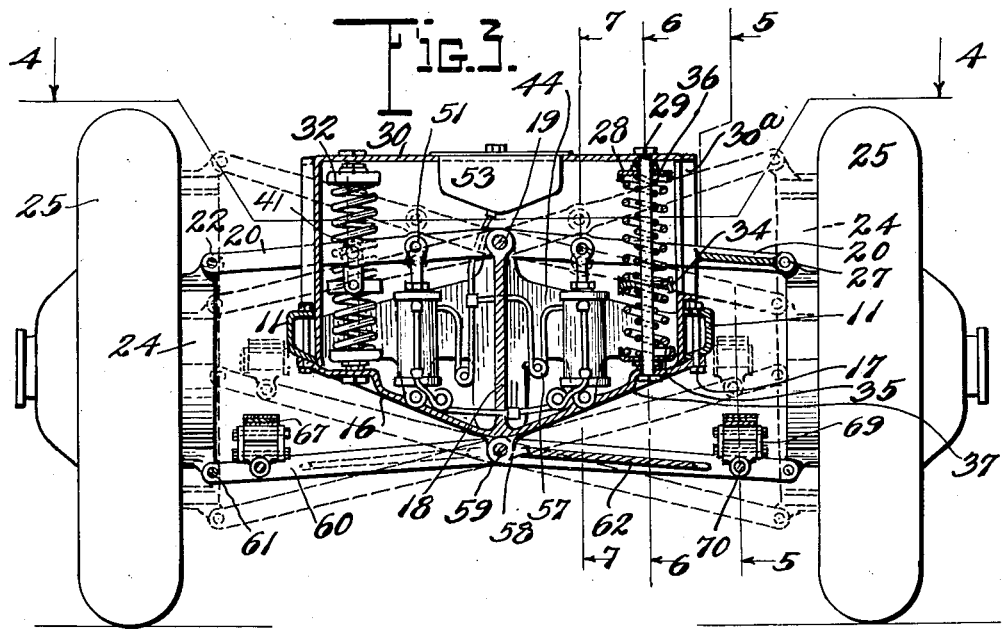
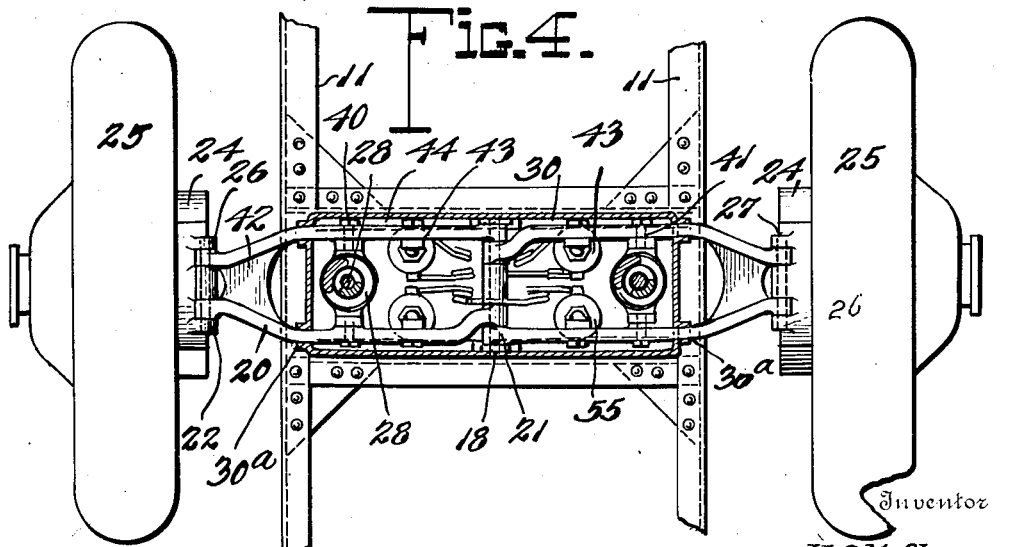

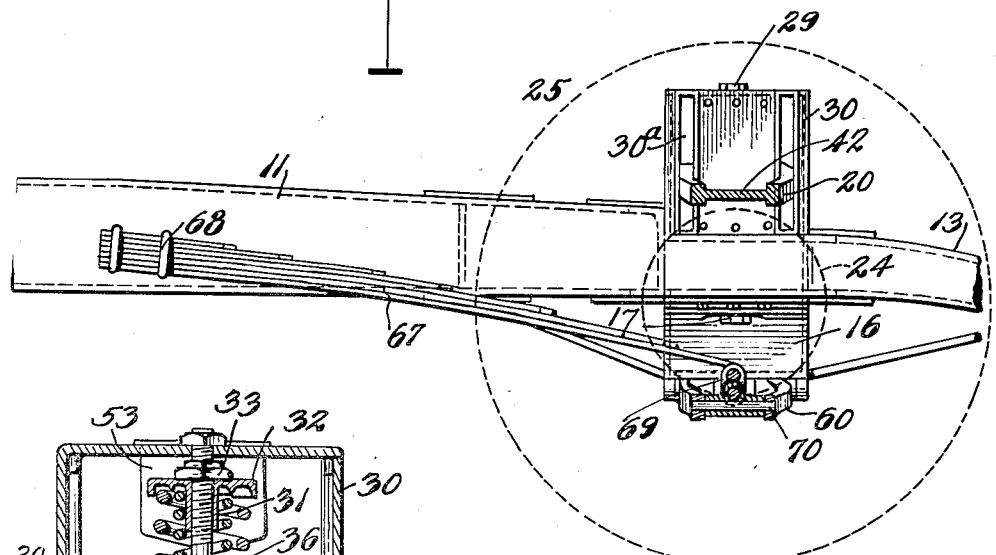
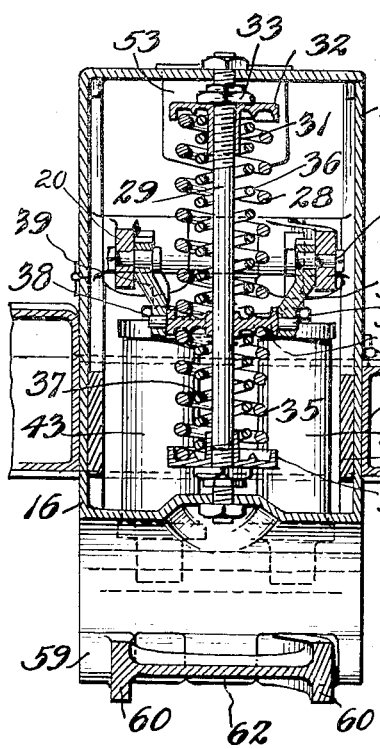
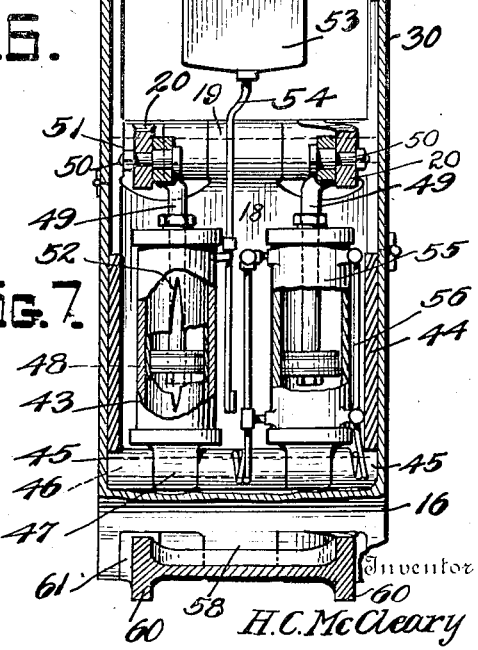

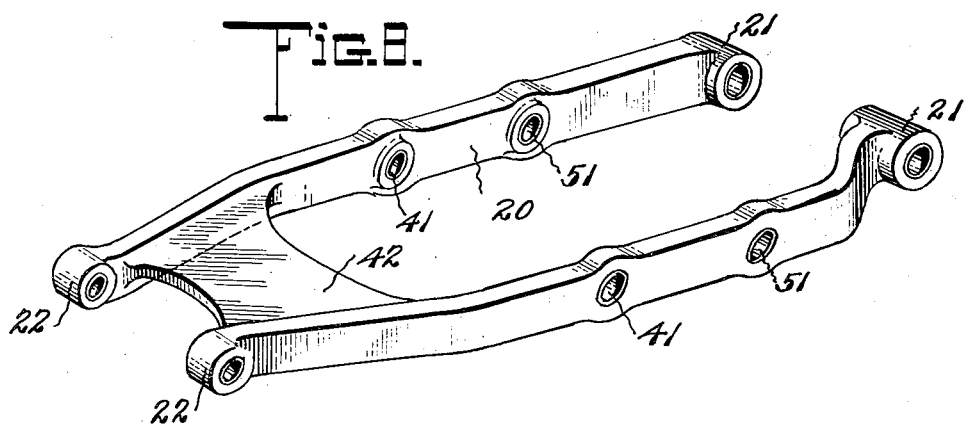
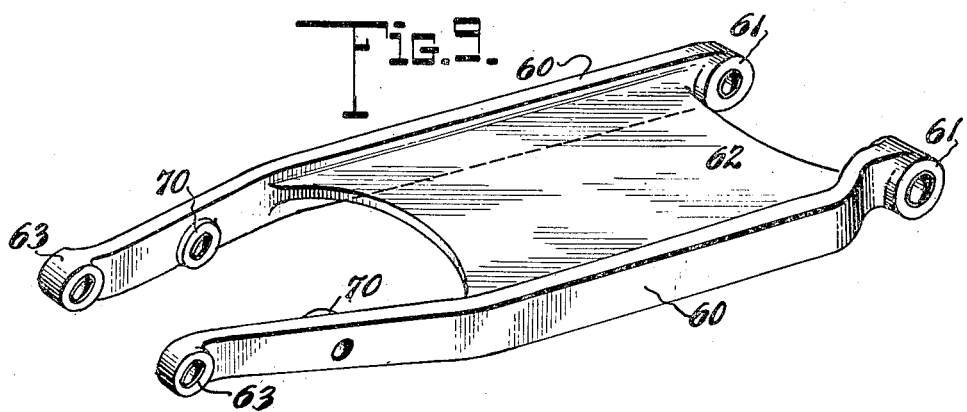
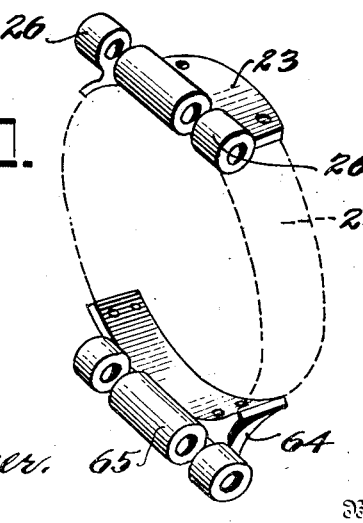
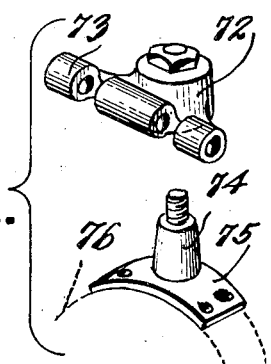

Patented Mar. 31, 1925.

1,531,963

UNITED STATES PATENT OFFICE.

HARRY C. McCLEARY, OF WASHINGTON, DISTRICT OF COLUMBIA, ASSIGNOR TO MAJESTIC PATENTS CORP., OF NEW YORK, N. Y., A CORPORATION OF NEW YORK.

SPRING SUSPENSION FOR MOTOR VEHICLES.

Application filed August 7, 1923. Serial No. 656,269.

*To all whom it may concern:*

Be it known that I, HARRY C. McCLEARY, a citizen of the United States, residing at Washington, in the District of Columbia, have invented certain new and useful Improvements in Spring Suspensions for Motor Vehicles, of which the following is a specification.

This invention relates to a spring suspension for motor vehicles, particularly to a construction adapted for application to a vehicle wherein the driving wheels are actuated by an electrical or other form of motor disposed to independently drive the wheels.

In prior types of spring suspension by which the use of an axle is obviated the connecting members have been yieldingly supported from a differential casing and the springs used for such purpose have not been practically controlled to effect a check upon their flexion under load and to avoid rebound or to maintain the body level by a stabilizing action. This invention presents a novel and improved construction in which the connecting members extend from a pivotal center intermediate the wheels to a frame carried thereby to oscillate in a vertical plane, and are provided with means to check the downward movement of the vehicle body and also with springs compressible in either direction of movement to effect a yielding support and prevent rebound of the parts.

A further object of the invention is to provide the connecting members with a carrying and stabilizing spring extending from the frame of the vehicle to a point intermediate the ends of the member to secure equalization of movement at opposite sides of the vehicle body.

Another object of the invention is to provide a structure in which connecting members are pivoted upon a casing carried by the vehicle frame and extend to the wheels at opposite sides thereof, together with vertically disposed coiled springs having a travelling member connected by a link with the connecting members, and a dash-pot disposed beneath the latter to resist downward movement thereof.

A further object of the invention is to provide a construction embodying parallel connecting members one of which is connected to the frame of a cantilever spring to assist in carrying the load and the other connected to a coiled spring to resist movement in either direction to cushion and also check any tendency to rebound.

Other and further objects and advantages of the invention will be hereinafter set forth and the novel features thereof defined by the appended claims.

In the drawings:—

Figure 1 is a plan of the vehicle structure with the outlines of the body indicated by dotted lines;

Figure 2 is a side elevation of a motor vehicle with the invention applied thereto;

Figure 3 is an enlarged section on the line 3—3 of Figure 1;

Figure 4 is a section on the line 4—4 of Figure 3;

Figure 5 is a detailed section on line 5—5 of Figure 3;

Figure 6 is a similar view on line 6—6 of Figure 3;

Figure 7 is a like view on line 7—7 of Figure 3;

Figure 8 is a detail perspective of the upper connecting member;

Figure 9 is a similar view of the lower carrying member.

Figure 10 is a detail perspective of the pivotal connection at the rear wheel;

Figure 11 is a similar view of the same connection for the front or steering wheel.

Like numerals refer to like parts throughout the several figures of the drawing.

The invention is applicable to any type of motor vehicle but is particularly adapted for a construction in which the wheels are driven by independent motors and the general construction and arrangement of the parts at the front and rear of the vehicle are similar. In the form shown the numeral 10 designates the body of the vehicle which may be of any preferred character, and is supported upon the frame 11 comprising parallel beams, preferably of channel construction, connected by suitable braces 12 and extended at the rear to form a support 13 for a trunk or other receptacle. The front of this frame is also provided with the inwardly bent portions 14 and 15 to permit a short turning radius of the wheels, as indicated in Figure 1. The structure of this frame is not claimed in the present application.

The frame members 11 support a casing which carries parallel connecting members extending to the wheel frame and in the form of the invention here shown this casing 16 is secured to the frame in any desired manner, for instance by bolts 17, and is provided with a central support 18 disposed at the longitudinal center of the vehicle frame and provided at its upper end with a pivot 19 upon which the oppositely extending connecting members or arms 20 are mounted, as shown in Figure 4. These connecting members 20 are provided with pivoting lugs 21 at their inner ends, as shown in Figure 8, and the opposite end thereof formed with bearings 22 to cooperate with a pivoting plate 23 mounted upon a frame or other structure 24 carried by the wheel 25. The plate 23 is formed with the bearing lugs 26 through which a suitable pivot pin 27 extends. The connectors 20 at opposite sides of the vehicle center are substantially similar in construction.

For the purpose of cushioning the action of the carrying members 20 and also preventing rebound thereof, a coiled spring 28 is disposed vertically within the casing 16 and surrounds a guide rod 29 secured at its lower end to the casing and at its upper end to an enclosing boxing 30 by which the parts are protected. This boxing is provided with suitable slots 30ᵃ to permit movement of the connecting members extending therethrough. The rod 29 is threaded at its opposite ends as at 31 and provided with a spring holding cup 32 adjustable thereon by means of the nut 33 so as to determine the tension of the spring 28. These parts are duplicated at the opposite ends of the rod. The spring 28 bears at its upper end against the cup 32 and at its lower end against a slidingly mounted plate 34 which is supported by a lower spring 35 similar to the spring 28. Within the spring 28 a supplemental spring 36 is disposed and a similar spring 37 is located within the spring 35 so as to provide different degrees of tension in the yielding movement of the parts.

The plate 34 is formed at opposite points with pivot pins 38 upon which the links 39 are mounted and connected at their opposite ends by a pivot 40 with the bearings 41 upon the carrying member 20, as indicated in Figures 6 and 8. These members 20 may comprise parallel arms connected by a web 42 to form a convenient structure for assemblage in which all of the parts will be properly located.

The downward movement of the connecting frames is also checked or resisted by any suitable construction of cylinder or dash pot 43, as indicated in Figures 3 and 7. The cylinder of this dash pot may be conveniently mounted upon cross plates 44 extending from the opposite ends of the plate 18 and formed with bearing lugs 45 at opposite sides of the central plate adapted to receive a pivot pin 46 extending through a lug 47 from the cylinder of the dash pot. The piston 48 from the dash pot is connected with the carrying member by means of its rod 49 pivotally connected by a pin 50 entering the bearing 51 of the connecting member 20.

While the specific construction of the dash pots and their controlling means is not herein claimed but forms the subject of a separate application, it may be stated that the two shown in Figure 7 are of different construction, the one at the left having a tapering groove 52 in the cylinder wall to form a by-pass around the piston and its cylinder is connected with a reservoir 53 for oil or suitable liquid from which a pipe line 54 extends to the cylinder. The opposite or right hand cylinder, indicated at 55 in Figure 7, is connected at opposite ends by a pipe line 56 to establish a circulating system therethrough and with a feed line 57 communicating with the reservoir 53. The several pipe lines connecting the dash pots and reservoir with the controlling system are provided with coiled portions to permit a proper yielding thereof in the movement of the cylinders upon their supports incident to the pivotal travel of the connecting members 20.

The casing 16 is provided at its base with supporting bearings 58 to receive a pivot pin 59 for the lower carrying members or arms 60 which are formed with bearing portions 61 for that purpose, as shown in Figure 9. These arms are connected by a web plate 62 to form an integral member and provided at their outer ends with the bearings 63 adapted to be mounted in the bearing plate 64 having the lugs 65 thereon similar in construction and operation to the plate 23 before described and carried by the frame 24 upon the wheel. The carrying members 60 lie parallel to the members 20 and are connected to the frame 11 of the vehicle by means of a cantilever spring 67 secured to the frame in any desired manner, as indicated at 68 in Figures 1 and 2. The free end of this spring is pivotally mounted upon the carrying member 60 intermediate its ends, by means of a shackle 69 pivoted to the bearings 70 upon the arms of the lower connector.

The front or steering wheels 71 are connected with the frame by substantially the same form of spring suspension as before described. The load upon these wheels is of a fixed character while the load upon the rear wheels is variable so that the use of the stabilizing spring is not essential in connection with the front wheels. Otherwise the connecting members 20 and 60 extend from the central bearing and for the purpose of permitting a pivotal movement of the wheels in steering these connectors are mounted upon a head 72 having bearings 73 for the ends of the connectors, such head being seated upon a post 74 carried by a plate 75 secured to a fixed member 76 upon the wheel structure. These parts are duplicated at the upper and lower faces of the wheel and the specific construction thereof shown by Figure 11.

In the operation of the invention it will be seen that the load upon the vehicle carries the central connection of the pivotal arms downward as indicated by dotted lines in Figure 3 while the rebounding action effects an opposite movement of these arms as also indicated by dotted lines therein, the full line position being the normal relation of the parts. The structure therefore presents means by which the wheels may independently rise and fall in passing over obstacles so that each side of the parallel connectors comprises a separate unit which effectually prevents a tilting of the vehicle and the consequent side movement produced thereby, while the assembled structure provides for a checking of the downward movement of the connectors and thereby supporting the weight of the vehicle while this movement is yieldingly sustained by the springs connected with the upper arms to prevent a rebounding action. The lower connectors at the rear are provided with the stabilizing springs which assist in carrying the load and also prevent the side sway or rocking movement incident to passing over a rolling surface in the road or obstacle thereon. The structure is particularly designed for application to vehicles where the wheels are independently driven and replaces the usual differential and connecting shafts therefrom, so that it is practically concealed beneath the body and rigidly supported by the frame.

The mounting of the connectors upon a common pivot at substantially the longitudinal center of the frame secures an absolutely equal movement at each side thereof and produces the most steady and resilient riding qualities. It will be observed that one set of the connecting plates is held under spring tension against movement in either direction, and these plates are also checked in their downward movement by the dash pot applied intermediate of the ends of the connector so that a free or bouncing movement of this support is prevented.

The mounting of the casing carrying the connectors and their controlling springs is such as to permit its removal as a unit by a downward movement thereof after the disconnection from the frame, wheels and other fixed parts. The construction of the connector arms is such that they are interchangeable from side to side and the connection of these arms with the wheel provides for a low mounting of the body which increases the stability at high speeds and prevents skidding.

While the specific details of construction of the several parts have been herein shown and described, the invention is not confined thereto as changes and alterations may be made without departing from the spirit thereof as defined by the appended claims.

Having thus described my invention, what I claim as new and desire to secure by Letters Patent is:—

1. In a spring suspension for vehicles of the no-axle type, a casing thereon provided with a central support having aligned pivots at its upper and lower portion disposed at substantially the longitudinal center of the vehicle, wheel members at opposite sides of said casing, connectors from the pivot at the top of said support to said wheel members, connectors from the lower pivot of said support to said wheel members, springs mounted upon the casing beneath the upper connectors, rebound springs carried by the casing and disposed to resist upward movement of the upper connectors, and independent means beneath said upper connectors disposed intermediate of said springs and the pivot upon said support to check the downward travel of the connectors.

2. In a spring suspension for vehicles of the no-axle type, a casing thereon provided with a central support having aligned pivots at its upper and lower portion disposed at substantially the longitudinal center of the vehicle, wheel members at opposite sides of said casing, connectors from the pivot at the top of said support to said wheel members, connectors from the lower pivot of said support to said wheel members, springs mounted upon the casing beneath the upper connectors, rebound springs carried by the casing and disposed to resist upward movement of the upper connectors, independent means beneath said upper connectors disposed intermediate of said springs and the pivot upon said support to check the downward travel of the connectors, and separate means extending from the lower connectors to a fixed point for stabilizing the movement thereof.

3. In a spring suspension for vehicles of the no-axle type, a casing thereon provided with a central support having aligned pivots at its upper and lower portion disposed at substantially the longitudinal center of the vehicle, wheel members at opposite sides of said casing, connectors from the pivot at the top of said support to said wheel members, connectors from the lower pivot of said support to said wheel members, springs mounted upon the casing beneath the upper connectors, rebound springs carried by the casing and disposed to resist upward movement of the upper connectors, independent means beneath said upper connectors disposed intermediate of said springs and the pivot upon said support to check the downward travel of the connectors, and tension springs connected to the lower connectors and extending transversely thereof to a fixed point.

4. In a spring suspension for vehicles of the no-axle type, a casing thereon provided with a central support having aligned pivots at its upper and lower portion disposed at substantially the longitudinal center of the vehicle, wheel members at opposite sides of said casing, connectors from the pivot at the top of said support to said wheel members, connectors from the lower pivot of said support to said wheel members, springs mounted upon the casing beneath the upper connectors, rebound springs carried by the casing and disposed to resist upward movement of the upper connectors, and a cylinder and piston device connected to said casings and upper connectors intermediate the pivot of the latter and the spring support therefor.

5. In a spring suspension for vehicles, a frame, a casing thereon, a wheel carrying a support, opposite connecting members pivoted on a common center upon the frame at substantially the longitudinal center of the vehicle and also pivoted to said support, a secondary pair of connecting members similarly pivoted upon the casing in the plane of said common center and also upon the wheel support, and a yielding connection between said secondary members and the frame.

6. In a spring suspension for vehicles, a frame, a casing thereon, a wheel carrying a support, opposite connecting members pivoted upon the frame at substantially the longitudinal center of the vehicle and also pivoted to said support, a secondary pair of connecting members similarly pivoted upon the casing and wheel, and a cantilever spring secured to the frame and pivoted to said secondary connectors at a point intermediate their ends.

7. In a spring suspension for vehicles, a frame, a casing thereon provided with a central pivotal support, a wheel provided with a support, opposite connecting members pivoted to said central support and wheel support, vertically disposed tension springs carried by said casing and connected to said members to resist movement thereof in either direction, a pivoted cylinder within the casing, and a piston therein pivotally connected to said members.

8. In a spring suspension for vehicles, a frame comprising parallel members, a casing disposed between said members for removal therefrom, a relatively fixed support carried by the wheels, a pivotal support at the upper and lower portion of said casing, parallel oppositely disposed connecting members pivoted upon the casing support and wheel support, a guide rod carried by said casing, opposite tension springs surrounding said rod, a plate intermediate said springs, and a connection from said plate to the upper connecting members.

9. In a spring suspension for vehicles, a frame, a casing supported thereon, a wheel provided with a support, a connecting member pivoted to said casing and to the support, a guide rod vertically supported in said casing, opposite tension springs surrounding said rod, a plate interposed intermediate of said springs, and a link pivotally connected to said plate and connecting member.

10. In a spring suspension for vehicles, a frame, a casing supported thereon, a wheel provided with a support, a connecting member pivoted to said casing and to the support, a guide rod vertically supported in said casing, opposite tension springs surrounding said rod, a plate interposed intermediate of said springs, a link pivotally connected to said plate and connecting member, and means upon the opposite ends of said rod for adjusting the tension of the springs thereon.

11. In a spring suspension for vehicles, a frame, a casing thereon, a wheel provided with a support, and a connecting member comprising parallel arms having pivoting sockets at opposite ends for attachment to the casing and wheel support and intermediate sockets for the connection of a spring device links mounted in said intermediate sockets and carrying a spring bearing plate, and springs supported by the casing to bear upon opposite faces of said plate.

12. In a spring suspension for vehicles, a frame, a casing thereon provided with a central support having pivotal bearings at the top and bottom thereof disposed in the same vertical plane and lateral supporting plates disposed within the casing, connecting arms pivoted upon said bearings and extending to opposite wheels, oppositely disposed springs within the casing for yieldingly resisting movement of the upper arms in either direction, and a spring carried by the frame parallel thereto and connected to the lower arms adjacent the wheels to resist downward movement thereof.

13. In a spring suspension for vehicles, a frame, a casing thereon provided with a central support having pivotal bearings at the top and bottom thereof and lateral supporting plates disposed within the casing, connecting arms pivoted upon said support and extending to opposite wheels, means within the casing for yieldingly resisting movement of the upper arms in either direction, a cylinder pivoted upon said lateral plates, a piston within said cylinder having its rod pivotally connected to the upper arms, and means for maintaining a fluid medium within said cylinder.

In testimony whereof I affix my signature.

HARRY C. McCLEARY.